United States Patent [19]

Paul

[11] Patent Number: 5,155,276
[45] Date of Patent: Oct. 13, 1992

[54] PROCESS FOR THE ISOMERIZATION OF HUMULONE IN A CARBON DIOXIDE-HOPS EXTRACT AND A PROCESS FOR THE ISOLATION OF ISOHUMULONE FROM IT

[75] Inventor: Herbert Paul, Geisenfeld, Fed. Rep. of Germany

[73] Assignee: Hopstabil Hopfenverarbeitungs GmbH, Fed. Rep. of Germany

[21] Appl. No.: 756,698

[22] Filed: Sep. 9, 1991

[30] Foreign Application Priority Data

Sep. 10, 1990 [EP] European Pat. Off. ........ 90117373.2

[51] Int. Cl.⁵ .............................................. C07C 45/67
[52] U.S. Cl. ..................................................... 568/341
[58] Field of Search ......................................... 568/341

[56] References Cited

U.S. PATENT DOCUMENTS

| | | | |
|---|---|---|---|
| 3,392,061 | 4/1976 | Koller et al. | 568/341 |
| 4,002,683 | 1/1977 | Todd | 568/341 |
| 4,160,787 | 7/1979 | Moll et al. | 568/341 |
| 4,247,483 | 1/1981 | Baker et al. | 568/341 |
| 4,918,240 | 4/1990 | Todd et al. | 568/341 |

FOREIGN PATENT DOCUMENTS

| | | | |
|---|---|---|---|
| 0363023 | 4/1990 | European Pat. Off. | 568/341 |
| 1817636 | 6/1970 | Fed. Rep. of Germany | 568/341 |
| 3609046 | 9/1987 | Fed. Rep. of Germany | 568/341 |

*Primary Examiner*—James H. Reamer
*Attorney, Agent, or Firm*—Sughrue, Mion, Zinn, Macpeak & Seas

[57] ABSTRACT

The invention concerns a process for the isomerization of humulon in a carbon dioxide-hops extract and a process for the isolation of isohumulon from the isomerized carbon dioxide-hops extract. Aluminium or an aluminium compound, preferably aluminium trioxide is added to the carbon dioxide-hops extract in such a concentration that the mole ratio of aluminium: alpha acid (alpha humulon) amounts to from 1:0.1 to 1:6. The mixture is then treated with high alkali hydroxide concentration at a temperature of from 80° to 160° C.

Isohumulon is obtained from the extract by adding so much tempered water that the isohumulon share amounts to 1 to 10% and the temperature is reduced to 40° to 45° C., and after further cooling to room temperature, the alkali isohumulons are purified from the other components in conventional manner and optionally are transformed in the conventional way into isohumulons.

16 Claims, No Drawings

PROCESS FOR THE ISOMERIZATION OF HUMULONE IN A CARBON DIOXIDE-HOPS EXTRACT AND A PROCESS FOR THE ISOLATION OF ISOHUMULONE FROM IT

The present invention concerns a process for the isomerization of humulone in a carbon dioxide-hops extract and a process for the isolation of isohumulone from a carbon dioxide-hops extract.

Isohumulones are bitter substances for beer, which are isolated by reprocessing the carbon dioxide-hops extract.

The previously known processes for their isolation have a number of disadvantages.

In U.S. Pat. No. 3,952,061 the isomerization of humulone or of a material containing humulon to form isohumulone is described, in which the isomerization is carried out at increased temperatures and at a pH value of less than 9 in a liquid medium, which contains at least one salt of a bivalent metal or of cerium.

The reaction medium has to be selected so that the salt, while forming a metallic cation and an anion, dissociates humulone, or the material containing it, resulting in the formation of the humulate anion. The metal ion then forms a complex with the humulate ion, which is isomerized at increased temperature. After the isomerization of the complex, the pure isohumulone is isolated by acidification and subsequent conventional reprocessing methods.

In U.S. Pat. No. 3,952,061 a mixture of water and an organic solvent, in which humulone is soluble, is recommended as the reaction medium. The disadvantage in this process is the use of organic solvents and the subsequent complicated reprocessing steps. According to the examples, after the acidification with ether extraction is carried out, the extract must be dried and a solvent distilled off in the rotation evaporator.

DE-OS 36 09 046 describes a process in which in a first stage, fractionated separation of the alpha acids from the carbon dioxide-hops extract is performed. In a second subsequent stage, by heating the aqueous alpha acid fraction thus obtained in the presence of not more than one equimolar alkali equivalent with respect to the alpha acids which are present, the isomerization of the alpha acids is carried out to form iso-alpha acids (isohumulone).

According to an alternative embodiment of this process, the isomerization of the alpha acid fraction can be performed in the presence of other shares of the carbon dioxide-hops extract, as long as not more than approximately 1 base equivalent is present, and the initial pH value is not more than about 10. In a further course of the process, the isohumulone fraction can be isolated if desired.

This process, in which no catalyst is used, has the disadvantage that it is very time-consuming and that only a 70 to 75% yield is obtained during isomerization.

EP 0 363 023 discloses a process for the preparation of isohumulone, in which a hops extract, which is preferably produced by using carbon dioxide as the extraction agent, is mixed with a solid alkali or earth alkali salt, preferably magnesium salt or magnesium oxide. The mixture is then heated, at least to a temperature of 80° C., in order to perform the conversion of the alpha acid into iso-alpha acid (isohumulone).

The disadvantage of this process is that the reaction product is precipitated as a solid which is as hard as stone and has to be ground.

The extract is then subjected to an acid treatment and is subsequently extracted with alkali, e.g. potassium hydroxide. Therefore an ion exchange has to be carried out between potassium and magnesium ions, in order to obtain a potassium isohumulone which is soluble in water.

The purpose of the present invention is to develop an improved process for the isomerization of humulon in a carbon dioxide-hops extract, which does not have the disadvantages of the processes in the prior art.

This is achieved by a process for the isomerization of humulon in a carbon dioxide-hops extract, wherein the aluminium or an aluminium compound is added in such concentration to a carbon dioxide-hops extract, that the mole ratio of aluminium:alpha acid (alpha humulone) amounts to 1:0.1 to 1:6, and is subsequently treated with high alkali hydroxide concentration at a temperature of from 80° to 160° C.

Furthermore it is an object of the present invention to develop an improved process for the isolation of isohumulon from a carbon dioxide-hops extract.

This is achieved by a process for the isolation of isohumulone or alkali isohumulon from a carbon dioxide-hops extract, wherein the humulone is isomerized in a carbon dioxide-hops extract by adding aluminium or an aluminium compound in such concentration to a carbon dioxide hops extract, that the mole ratio of aluminium:alpha acid (humulone) amounts to 1:0.1 to 1:6, and then treating the mixture with high alkali hydroxide concentration at a temperature of 80° to 160° C. Isohumulone is obtained from the extract by adding so much water that the isohumulone share amounts to 1 to 10% and the temperature is reduced to 40° to 45° C. After further cooling to room temperature, the alkali are purified from the other components by a conventional manner and optionally are transformed by conventional means into isohumulones.

Preferred embodiments of the inventive process are described in the claims.

The advantages of the inventive process are that the isomerization is performed (because of the reaction accelerator which is used, aluminium or aluminium salts, or preferably aluminium oxide) within a very short time to almost 100%.

The insoluble aluminium trioxide which is preferably used, is removed by filtration or by decanting, for example in the course of the subsequent conventional purification steps.

A further advantage of the inventive process is that virtually no byproducts are formed.

The invention is based on the use of aluminium or aluminium compounds, preferably aluminium oxide, in the isomerization of humulone in the carbon dioxide-hops extract. The mole ratio of aluminium:alpha acid (humulone) amounts to 1:0.1 to 1:6, preferably 1:0.3 to 1:1, with special preference for 1:0.6. Preferably, aluminium (or its compounds) is added in excess to the extract, to guarantee better mixing with the extract.

The reaction is carried out in the presence of alkali hydroxide, preferably potassium hydroxide, at a temperature of preferably 92° C. The alkali hydroxide concentration in the extract must be very high. Preferably the mole ratio of potassium hydroxide:alpha acid in the extract amounts to 2:1.

In order to exclude the formation of hydrogen and the danger of a detonating gas reaction, preferably an aluminium salt compound is used, with special preference for aluminium oxide ($Al_2O_3$).

In the process according to the invention, a liquid to pasty isomerized carbon dioxide-hops extract is produced, which is not as hard as stone as in the case of the process which is described in EP 0 363 023. This pasty aggregate state is also characteristic of the non-isomerized initial extract, which is practically insoluble in water because of the very unpolar substances contained in it.

The isomerized extract is distinguished against this by a far-reaching solubility in water.

When adding preferably demineralized water while stirring, an aqueous emulsion (pH value between pH 10 to pH 12) results. The alkali isohumulones present are dissolved in it.

The alkali isohumulones are extracted from the isomerized carbon dioxide-hops extract by adding so much tempered water that the temperature is reduced to from 40° to 45° C. and the isohumulone share, after emulsification with water, amounts to 1 to 10%, preferably 5 to 10%.

It is possible, immediately after the isomerization, to add water which must have a temperature lower than 40° to 45° C., in order to obtain a temperature of 40° to 45° C. after emulsification with water. However, it is also possible to cool the isomerized extract to 40° to 45° C. and to add water at 40° to 45° C. on reaching this temperature.

After further cooling to room temperature the isohumulones are purified in the conventional manner removing the other components. This is done, for example, by gasifying with carbon dioxide until such time as a pH value of about 9.4 is attained. Then in a first filtration, the precipitated waxes are separated. Subsequently the solution is mixed with carbon dioxide until a pH value of about 9.0 is achieved, and the solution is left to stand for several hours. The insoluble components are precipitated and a pure alkali isohumulone solution can be obtained by filtration.

The filtrate thus obtained contains as the main component isohumulone, which is present as alkali isohumulon. It can be obtained in a concentration range of from 3 to 10%. A further concentration can be achieved, for example, by reverse osmosis.

The alkali isohumulones or isohumulons obtained by the inventive process can be used for the spicing of beer.

The carbon dioxide extract, when using aluminium or its salts and preferably aluminium oxide, is isomerized substantially more rapidly than with otherwise identical reaction conditions. In the light of this acceleration of the reaction which was not to be expected, aluminium or its compounds, and preferably aluminium trioxide, have a catalytic effect.

Further acceleration of the reaction speed takes place if a change is made from stationary conditions, such as are present e.g. in the dessicator cabinet, to non-stationary conditions, e.g. in the rotation evaporator.

Therefore for the industrial scale production of the isomerized carbon dioxide extract, the use of a suitable stirring and pumping system, in which a constant mixing of the extract and the catalyst takes place, and the atmospheric oxygen is kept as low as possible, is recommended.

Glass, but also high-grade steel, can be preferably used as the material of the reaction vessel. It is important that no contamination takes place with ferrous ions, to avoid the formation of undesirable byproducts and to avoid a reduced yield of isohumulone with a simultaneous loss of alpha acid.

Without causing any limitation, the invention is explained below in detail with reference to the examples.

The percentage information listed in the tables below with respect to "recovery of alpha acid" refers to the isomerized and non-isomerized shares.

EXAMPLE 1 shows the influence of aluminium or aluminium oxide on the rate of isomerization.

The carbon dioxide-hops extract was isomerized at 110° C. in the dessicator cabinet. The molar ratio of potassium hydroxide to alpha acid was 2:1.

The results are listed in the table 1 below.

TABLE 1

|  | Reaction time (min) | Isomerization % | Recovery alpha acid % | Recovery beta acid % |
| --- | --- | --- | --- | --- |
| Reaction vessel of glass | 60 | 18.6 | 100.2 | 95.5 |
|  | 90 | 24.7 | 102.3 | 92.8 |
|  | 120 | 49.8 | 104.5 | 83.6 |
|  | 240 | 71.9 | 104.5 | 93.1 |
| Immersion of aluminum rod in reaction vessel of glass | 60 | 92.3 | 95.6 | 92.7 |
|  | 180 | 96.7 | 96.7 | 63.8 |
| reaction vessel of aluminium | 60 | 101.7 | 102.6 | 84.1 |
| $Al_2O_3$ in extract | 60 | 97.8 | 101.6 | 62.7 |
|  | 180 | 100.0 | 100.9 | 45.8 |
| Immersion of iron rod in reaction vessel of glass | 60 | 25.7 | 71.4 | 92.2 |
|  | 90 | 76.1 | 102.8 | 93.5 |
|  | 120 | 74.1 | 87.9 | 88.1 |
|  | 240 | 74.8 | 80.8 | 59.1 |

From table 1 it can be seen that the influence of aluminium or $Al_2O_3$ is of decisive importance with respect to a complete isomerization of the alpha acid in isohumulone.

The worst results are obtained without using aluminium or aluminium oxide. When using iron, the reaction is indeed substantially better than without this additive, but maximally only about 75% isomerization is achieved.

EXAMPLE 2 shows the influence of the mole ratio potassium hydroxide:alpha acid on the isomerization rate.

Isomerization was carried out at 110° C. in the dessicator cabinet, and the reaction time was 60 minutes.

The table 2 below shows the results obtained.

TABLE 2

| Catalyst | mole ratio KOH:alpha acid | isomerization % | recovery alpha acid % | recovery beta acid % |
| --- | --- | --- | --- | --- |
| — | 2:1 | 24.0 | 100.5 | 93.6 |
| — | 1:1 | 22.0 | 76.9 | 98.9 |
| aluminium | 2:1 | 96.3 | 98.6 | 84.1 |
| aluminium | 1:1 | 27.1 | 90.0 | 87.6 |

A mole ratio of 2:1=KOH:alpha acid is necessary to achieve a satisfactory yield. When the KOH concentration is too low, the isomerization is inadequate. At the same time with the loss of alpha acids, undesirable byproducts occur.

EXAMPLE 3 concerns the influence of different types of hops.

To investigate a possible influence of the isomerization reaction by particular kinds of hops, corresponding tests were performed. The hops varieties differ in the ratio of the homologues of alpha and beta acids. Moreover their share of wax is variable.

The tests were carried out at 110° C. in the dessicator cabinet. The mole ratio KOH:alpha acid was 2:1. The mole ratio of alpha acid to aluminium oxide was 2.6: 1. Table 3 below shows the results obtained.

TABLE 3

| sort | alpha acid wt. % | beta acid wt. % | isomerization % | recovery alpha acid % | recovery beta acid % |
|---|---|---|---|---|---|
| HNB | 52.7 | 23.3 | 102.2 | 104.4 | 60.3 |
| HHE | 42.6 | 33.7 | 102.7 | 99.6 | 77.2 |
| HBG | 46.2 | 24.9 | 97.7 | 97.7 | 74.5 |
| HPE | 51.2 | 26.5 | 103.8 | 103.8 | 76.8 |
| TTE | 42.2 | 30.3 | 101.8 | 104.0 | 88.7 |

HNB = Hallertau Northernbrewer
HHE = Hallertau Hersbruck
HBG = Hallertau Brewers Gold
HPE = Hallertau Perle
TTE = Tettnang Therefore, there appears to be no influence due to the type of hops used.

EXAMPLE 4 concerns the influence of the temperature and of the mixing on the isomerization rate.

The test conditions were the same as described above. Aluminium oxide was used as the aluminium compound. The temperature was varied. Furthermore, tests were carried out stationary (in the dessicator cabinet) as well as with continuous mixing (in the rotation evaporator).

The results obtained are listed in the table 4 below.

TABLE 4

| temperature °C. | reaction time (min) | isomerization % | recovery alpha acid % | recovery beta acid % |
|---|---|---|---|---|
| 90 stat. | 60 | 14.4 | 102.7 | 84.1 |
| 90 stat. | 120 | 40.5 | 94.9 | 71.4 |
| 90 stat. | 180 | 68.5 | 101.8 | 68.1 |
| 90 stat. | 240 | 71.9 | 104.8 | 69.7 |
| 90 stat. | 300 | 62.5 | 100.4 | 72.4 |
| 90 stat. | 360 | 66.5 | 106.4 | 72.7 |
| 90 dyn. | 30 | 103.0 | 105.6 | 62.0 |
| 90 dyn. | 60 | 100.3 | 100.3 | 54.5 |
| 90 dyn. | 120 | 96.7 | 96.6 | 59.7 |
| 140 stat. | 30 | 104.6 | 104.6 | 67.9 |
| 140 stat. | 60 | 86.0 | 86.0 | 49.8 |
| 140 stat. | 120 | 74.6 | | |
| 70 dyn. | 45 | 18.7 | | |
| 70 dyn. | 90 | 30.7 | | |
| 70 dyn. | 150 | 41.9 | 74.5 | 54.8 | stat. = not mixed during the reaction time
dyn. = constantly mixed during the reaction time.

From the table it can be seen that both the temperature as well as the mixing have a decisive influence on the isomerization rate.

For technological reasons, a temperature from 92° to 95° C. (boiling point of water) is advantageous. A reaction time of 15 to 30 minutes is sufficient with good mixing of the extract and catalyst, as was shown by further tests, to achieve an isomerization of 95 to 100%.

A 30 minute reaction time is sufficient to achieve 100% isomerization for isomerization at 140° C. in the dessicator cabinet.

With longer incubation times, byproducts are increasingly formed.

EXAMPLE 5 shows the influence of the mole ratio aluminium:alpha acid on the isomerization rate.

The carbon dioxide-hops extract was isomerized in the rotation evaporator at 92° C. $Al_2O_3$ was used as the catalyst. The mole ratio KOH:alpha acid was 2:1. 4.2 g alpha acid were used. The mole ratio aluminium:alpha acid was varied.

The results obtained are listed in table 5.

TABLE 5

| mole ratio aluminium: alpha acid | isomerization % | recovery alpha acid % | recovery beta acid % |
|---|---|---|---|
| 1:0.6 | 102.3 | 102.3 | 66.3 |
| 1:1.2 | 98.3 | 102.4 | 83.1 |
| 1:3.0 | 96.2 | 103.4 | 89.9 |
| 1:5.8 | 90.3 | 104.4 | 91.7 |
| 1:10.0 | 45.6 | 94.2 | 96.7 |

From table 5 it is discernible that no satisfactory results are achieved with a mole ratio aluminium:alpha acid of more than 1:6. The isomerization should preferably be performed at a mole ratio of 1:0.6.

EXAMPLE 6 shows the influence of the added potassium hydroxide concentration on the concentration of the beta acids and the presence of chlorophyll in the extract.

| Conditions for isomerization of the carbon dioxide-hops extract: | |
|---|---|
| Mole ratio aluminium:alpha acid: | 1:0.6 |
| mole ratio KOH:alpha acid: | 2.2:1 |
| 54% KOH was added. | |
| Isomerization temperature: | 92° C. |

| Conditions when reprocessing the isomerized carbon dioxide-hops extract: | |
|---|---|
| Amount of added demineralized water: | 1 l |
| temperature of the added demineralized water: | 25° C. | reduction of the pH value to 9.0–9.2 by introducing carbon dioxide gas into the aqueous emulsion and subsequent one-time filtration.

The values obtained in table 6 below were determined after filtration in the filtrate.

TABLE 6

| extract No. | concentration of the added KOH solution | concentration of beta acid wt. % | presence of chlorophyll |
|---|---|---|---|
| 1 | 30% | 6.0 | yes |
| 2 | 26% | 6.6 | yes |
| 3 | 54% | 1.2 | no |
| 4 | 56% | 1.6 | no |

As can be seen from table 6, a further advantage of the inventive process is that beta acids are only dissolved to a small extent and the chlorophyl is practically not dissolved. However, this is dependent on the conditions in isomerization.

Thus the share of alkali hydroxide has to be dissolved with as little water as possible. If a higher proportion of water is added, substantially more beta acids and particularly chlorophyll are dissolved. The latter can then no longer be separated in the subsequent purification steps and thus it passes over into the clear potassium isohumulone solution which is finally obtained.

EXAMPLE 7

Isomerization was performed in the rotation evaporator. The reaction conditions were as follows:
Use of extract: 256.5 g
share of alpha acid in the extract: 111.3 g (MW 357.78 g)
addition of $Al_2O_3$ (MW 101.96): 12.85 g
This corresponds to a molecular ratio of aluminium:alpha acid = 1:0.6.
Addition of KOH: 38.57 g (MW 56.11) dissolved in 32.8 g distilled water (54% KOH solution).
This corresponds to a mole ratio of KOH:alpha acid = 2.2:1.
Incubation: 20 minutes in the boiling water bath (isomerization temperature: 92° C.).
Result:
  isomerization: 99.5%
  recovery alpha acid: 102.5%
  recovery beta acid: 84.2%

| Composition of the isomerized extract: | |
| --- | --- |
| alpha acid: | 0.9% by weight |
| beta acid: | 20.7% by weight |
| isoalpha acid: | 35.0% by weight |

The result is a high rate of isomerization. Tests under otherwise equal conditions but with longer incubation times led to a decrease in the isomerization rate and to an increase in undesirable byproducts.

EXAMPLE 8

In the following test, the isolation of the potassium isohumulones from the isomerized carbon dioxide extract according to example 7 is described.

The amount of the pasty extract was mixed immediately after isomerization with the corresponding amount (for example 1 l) of tempered (water temperature e.g. 25° C.) and distilled water while stirring, so that the isohumulone concentration amounted to 7 to 10% (e.g. 8.5%) and the temperature of the emulsion was from 40° to 45° C. (e.g. 40° C.). After cooling to room temperature it was gasified with carbon dioxide until such time as a pH value of 9.4 was achieved.

In a first filtration, the precipitated waxes were separated. Then the solution was further gasified with carbon dioxide gas until a pH value of 9.0 was achieved. The solution was left to stand for 10 hours. The insoluble components were precipitated. After their removal, the supernatant was filtered and analysed.

Isoalpha acid was recovered as to 88.5%. Furthermore, the solution contained 0.02% of alpha acids and 0.17% of beta acids. This percentage information refers to the initial substances.

The alpha and beta acids can be precipitated by the corresponding pH value adjustment, e.g. with carbon dioxide gas, and subsequently separated.

The potassium isohumulone solution thus obtained is clear, has a yellow-brown color and contains potassium isohumulone in a concentration of 7 to 10%. By suitable processes for concentration (e.g. reverse osmosis), an isohumulone content of 20 to 25% can be adjusted.

I claim:

1. A process for isomerizing humulone in a carbon-dioxide hops extract comprising the steps of:
   (a) adding aluminium or an aluminium compound to a carbon-dioxide hops extract, such that the mole ratio of aluminium to humulone in said extract is 1:0.1 to 1:6 and so as to form an admixture,
   (b) adding an alkali hydroxide to the resulting admixture of step (a), such that the alkali hydroxide concentration in said admixture is high, and performing isomerization at a temperature of 80° C. to 160° C.

2. The process of claim 1, wherein said aluminium compound is $Al_2O_3$.

3. The process of claim 1, wherein said alkali hydroxide is potassium hydroxide.

4. The process of claim 1, wherein the mole ratio of alkali hydroxide is humulone is 2:1.

5. The process of claim 1, wherein the isomerization is carried out at a temperature of 92° c.

6. The process of claim 1, wherein the mole ratio of aluminium to humulone in said extract is 1:0.3 to 1:1.

7. The process of claim 6, wherein the mole ratio of aluminium to humulone in said extract is 1:0.6.

8. A process for obtaining alkali isohumulone from a carbon-dioxide hops extract comprising the steps of:
   (a) adding aluminium or an aluminium compound to a carbon-dioxide hops extract, such that the mole ratio of aluminium to humulone in said extract is 1:0.1 to 1:6, and so as to form an admixture,
   (b) adding an alkali hydroxide to the resulting admixture of step (a), such that the alkali hydroxide concentration in said admixture is high, and performing isomerization at a temperature of 80° C. to 160° C.,
   (c) cooling the resulting admixture of step (b) to a temperature of 40° C. to 45° C. and then adding water having a temperature of 40° C. to 45° C. in such an amount that alkali isohumulone is obtained in an amount of 1 to 10%, or adding water in such an amount to the admixture of step (b) that the temperature is reduced to from 40° C. to 45° C. and alkali isohumulone is obtained in an amount of 1 to 10%,
   (d) cooling to room temperature, and
   (e) purifying the resulting alkali isohumulone.

9. The process of claim 8, wherein said aluminium compound is $Al_2O_3$.

10. The process of claim 8, wherein the alkali hydroxide is potassium hydroxide.

11. The process of claim 8, wherein the mole ratio of alkali hydroxide to humulone is 2:1.

12. The process of claim 8, wherein the isomerization is carried out at a temperature of 92° C.

13. The process of claim 8, wherein the mole ratio of aluminium to humulone in said extract is 1:0.3 to 1:1.

14. The process of claim 13, wherein the mole ratio of aluminium to humulone in said extract is 1:0.6.

15. The process of claim 8, wherein in step (c) such an amount of water is added that alkali isohumulone is obtained in an amount of 5 to 10%.

16. The process of claim 8, wherein said water is demineralized water.

* * * * *